| | N (n,w,o,u) | S (s,ks,f,v,d,t) | I (i,a,e,l,r,dr, be) | interval |
|---|---|---|---|---|
| a | L | O | L | O |
| b | O | L | L | O |

| NUMBERS IN ENGLISH | N1 | S1 | I | N2 | S2 | NUMBERS IN GERMAN |
|---|---|---|---|---|---|---|
| zero | L | O | L | O | O | NULL |
| one | O | O | L | L | L | EINS |
| two | L | L | L | O | O | ZWEI |
| three | O | O | L | O | O | DREI |
| four | O | L | L | O | O | VIER |
| five | O | L | L | L | L | FÜNF |
| six | O | L | L | O | L | SECHS |
| seven | O | L | L | L | O | SIEBEN |
| eight | O | O | L | O | L | ACHT |
| nine | L | O | L | L | O | NEUN |

Inventor:
HEINZ KUSCH,
BY Spencer & Kaye
ATTORNEYS

CIRCUIT ARRANGEMENT FOR RECOGNIZING SPOKEN NUMBERS

Inventor:
HEINZ KUSCH,
BY Spencer & Kaye
ATTORNEYS

INVENTOR.
HEINZ KUSCH,
BY Spencer & Kaye
ATTORNEYS

United States Patent Office 3,445,594
Patented May 20, 1969

3,445,594

CIRCUIT ARRANGEMENT FOR RECOGNIZING SPOKEN NUMBERS

Heinz Kusch, Ulm (Danube), Germany, assignor to Telefunken Patentverwertungsgesellschaft m.b.H., Ulm (Danube), Germany Filed July 29, 1965, Ser. No. 475,708
Claims priority, application Germany, July 29, 1964, T 26,689
Int. Cl. H04m *1/26, 1/62;* G01r *23/16*
U.S. Cl. 179—1 13 Claims

ABSTRACT OF THE DISCLOSURE

A circuit arrangement for recognizing spoken words in which the speech is fed to two discriminating elements one of which detects those oscillations which exceed a predetermined threshold of a range of relatively high frequencies which occur alone or as a component of the speech wave form. The other detects waves which exceed a predetermined threshold of relatively low or fundamental oscillations occurring alone or as a component of a speech waveform. These two devices provide digital outputs and are successively interrogated. The combinations of their outputs are evaluated and set into storing elements. The storage is also provided depending upon the sequence in which the combinations occur.

*Background of the invention*

The present invention relates generally to the automatic recognition art and, more particularly, to an arrangement for automatically recognizing spoken sound groups, for example, words which are numbers or digits and wherein sound waves are examined regarding particular characteristics thereof which are the same for several different sounds, the selected characteristics are used to provide signals indicating their presence, and the signals are stored and evaluated in a combining matrix.

There have been prior proposals for the automatic recognition of spoken sounds or words. Devices which are capable of doing this could be used advantageously for the feeding of data into computers, dialing numbers on a telephone, writing texts, controlling machines, etc.

A conventional manner of solving this problem is to examine electrical waves which correspond to the waves of a sound. They are examined at intervals as to the short time frequency spectra present in the sound waves. This examination is carried out using bandpass filters. Signals which correspond to the frequency distribution in several successive spectra are stored in a shifting matrix so that a comparison could take place with stored signal patterns which are formed by the sounds of a "standard speaker."

*Summary of the invention*

It is an object of the invention to provide a device of the character described wherein entire sound groups, such as words including numbers can be recognized.

It is another object of the present invention to provide an arrangement for examining speech waveforms at intervals regarding certain characteristics thereof and to store these characteristic distributions as a signal pattern.

A further object of the invention is to provide an arrangement which can recognize speech and wherein only a few basic characteristics need be examined so that the device can be constructed in a simple manner which requires only a relatively small volume.

A still further object of the invention is to provide a speech recognition arrangement which tests and recognizes sounds with regard to the basic structural characteristics of the sound patterns and which does not depend upon the sound characteristic and the articulation differences of different speakers.

Still another object of the invention is to provide a device of the character described which accurately recognizes spoken sounds even with different speakers having poor articulation.

These objects and others ancillary thereto are accomplished in accordance with preferred embodiments of the invention wherein apparatus is provided for examining selected characteristics of speech forms. Those characteristics selected are ones which are the same for the sound characteristic waveforms of several different sounds. For each sound group, a signal storage unit is provided which is actuated when the particular characteristic occurs. Upon completion of the sound group, the storage groups become effective in combinations which are determined by the recognized sound groups to send signals into recognizing channels for the sound groups.

Means are provided for assuring that characteristics actuate different storage signal units assigned to them depending upon the order in which these occur. Such characteristics as the clear occurrence or absence of fundamental oscillations as well as the clear occurrence or absence of superimposed oscillations of the sound characteristic waveform are used. If required, more detailed examinations can be made, particularly examinations of the duration or the number of times that sound groups occur. The signals which are stored in the signal units are evaluated together for the recognition of sound groups forming a word.

*Description of the preferred embodiments*

With more particular reference to the drawings, it is to be noted that the present invention will be disclosed for spoken numbers in the German language. For example, in the table shown in FIGURE 3 in the left column, the German "null" is zero, the "eins" is one, and the "neun" is nine. The numbers between eins and neun are the numbers two through eight in English. It will be clear after a consideration of the present invention that the device can be arranged to recognize spoken English numbers as well.

Figures 1, 2, 3:
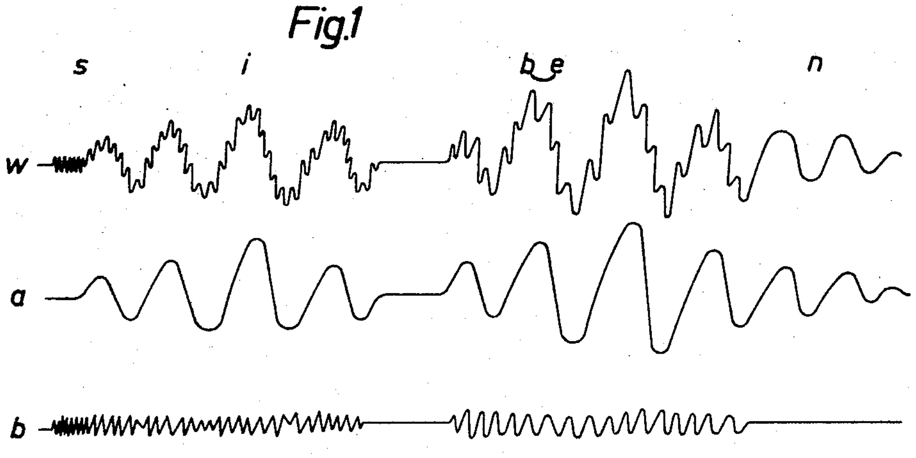
FIGURE 1 shows time plots in the form of oscillograms of various characteristics of a sound wave for a particular spoken word.
FIGURE 2 is a table showing logic characteristics for particular sounds.
FIGURE 3 is a table showing logic characteristics for words which are numbers.

In FIGURE 1, the line *w* is an oscillogram of the spoken German word "sieben" (seven). An examination of the course of the waveform shows two characteristics. One clearly shows a low or "fundamental oscillation" which is shown by itself at line *a*, which represents an oscillogram. There is also the clear occurrence of substantially quicker oscillations which are the higher frequency or "superimposed oscillations." These oscillations can also be considered "roughness," and they are shown separated from the other waves in oscillogram *b*. The two oscillation portions *a* and *b* can be obtained in a sufficiently clear manner from the over-all or total wave. Each of the two oscillation portions has higher and lower amplitudes at different times, and in order to obtain the characteristics, a threshold is provided so that sufficiently high amplitudes (particular oscillation clearly present— signal L) can be distinguished from insufficiently high amplitudes (particular oscillation not present, or not clearly present—O).

It can be determined that the combination $a=L$ and $b=O$ occurs not only when the sound "n" occurs, but also, for example, at the sounds *w*, *o* and *u*, and this sound group is designated as sound group N. A second sound group S which produces the combination $a=O$, $b=L$ is provided for the sound *s* and also for *f* (*v*), *ks*, *d* and *t*. A further sound group I provides the combination $a=L$, and $b=L$, and this is produced by the sound *i* as well as by *a*, *b*, *e*, *l*, *r* and *dr*. This can all be seen from the characteristic table shown in FIGURE 2. This simple code provides a first basic step for the recognition of words, and starting from this point, the sequence in which such sounds occur can be automatically determined in order to complete a coding of the words.

With only a few sequence criteria, it is then possible to automatically recognize such things as a spoken number, for example, null to neun or zero to nine. For this purpose, it is sufficient, if, in addition to the recognition of the three sound groups N, S and I, the occurrence of the sound groups N and S before and/or after the sound group I is recognized. The sound groups N and S which come before the sound group I are designated N1 and S1 and the sound groups which occur after sound group I are designated N2 and S2. With this in mind, it can be seen that the German words representing numbers can be coded as shown in FIGURE 3.

Figure 4:
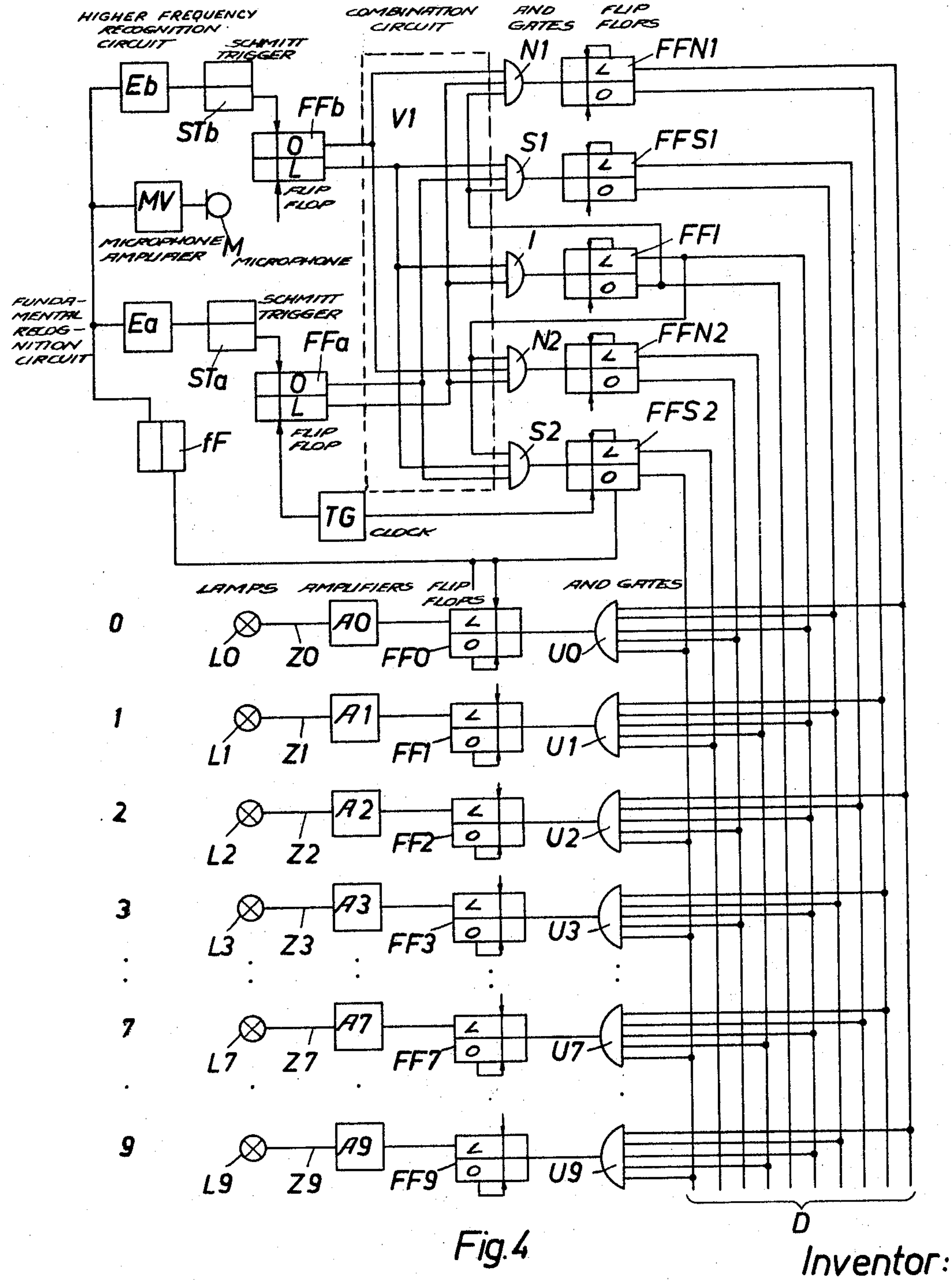
FIGURE 4 is a circuit diagram for a device for recognizing words which represent numbers.

With more particular reference to FIGURE 4, a circuit for a device for recognizing a word which is a number and operating with the above described coding is shown. A microphone M is provided and the words representing numbers are spoken into it. An automatic-volume-control amplifier MV is connected to the microphone. The amplified electrical speech waves are fed into a first or fundamental recognition circuit E*a* for recognizing the fundamental oscillation portion of the speech waves and, at the same time is fed into a second recognition circuit E*b* for recognizing the waves *b*, which is the superimposed oscillations and/or roughness. A Schmitt trigger ST*a* is connected to the output of the circuit E*a*, and another Schmitt trigger ST*b* is connected to the output of circuit E*b*.

If the waves *a* or *b* appear with a sufficient amplitude, the Schmitt trigger ST*a* or ST*b* will change over into its other conducting condition and a change-over or trigger pulse will be fed to a bistable flip-flop, FF*a* or FF*b*. The outputs "O" and "L" of the flip-flops FF*a* and FF*b* are connected by means of a combination circuit V1 according to the table of FIGURE 2 to AND-gates N1, S1, I, N2, S2, which are enabled by "O" potential. The basic output values of these flip-flops are noted in FIGURE 4. A bistable coding flip-flop is connected to the output of each of these AND-gates so that there are five coding flip-flops FFN1, FFS1, FFI, FFN2 and FFS2 which are used as signal storing devices.

While the AND-gate I has no further inputs than the ones indicated in the table of FIGURE 2, the AND-gates N1, S1, N2, S2, each have a third input. The third inputs of N1 and S1 are connected to the "O" output of flip-flop FFI. The third inputs of AND-gates N2 and S2 are connected to the other or "L" output of flip-flop FFI. It can thus be seen that sound groups N and S which occur before sound group I actuate the coding flip-flops FFN1 or FFS1. On the other hand, the coding flip-flops FFN2 or FFS2 have their condition changed if these sound groups N and S occur after the sound group I.

The O and L outputs of the coding flip-flops are connected into a decoding matrix D which is connected to 10 AND-gates U0 through U9 (also enabled by O-potential) in accordance with the logic table shown in FIGURE 3. A bistable flip-flop FF*x*, where $x=0, 1 \ldots 9$, is connected to the output of every AND-gate U*x*. The active output of each of these flip-flops is fed through an amplifier A*x* to a number or digit value output channel Z*x* by means of which an optical number indicator L*x*, such as is shown in FIGURE 4, or any other operating member, such as a computer key, can be actuated.

In order to obtain the characteristic coding on the five coding flip-flops, the waveform of every word which is a number must be interrogated at certain intervals for the presence or absence of the waveforms *a* and *b*. A clock pulse generator TG such as an astable multivibrator is connected for this purpose and supplies interrogation pulses which may be, for example, at a steady frequency of about 10 cycles per second. These pulses reset in a delayed manner as known in the art the input flip-flops FF*a* and FF*b* if these flip-flops had been set. At the same time, these clock pulses provide for a timed setting of the five coding flip-flops in accordance with the signal voltages which are still present at the gates connected to the inputs of these flip-flops.

Furthermore, a monostable flip-flop *f*F is provided which is changed over into its non-stable condition by the rising flank of the wave of every newly-spoken word which is a number, and it is returned into its initial condition after a fixed predetermined period of time of about 1 or 2 seconds. The pulse which is provided when the monostable flip-flop returns to its initial condition causes the delayed resetting and the interrogating of the five coding flip-flops whereby an output flip-flop is set, and the others are reset.

Figure 5:
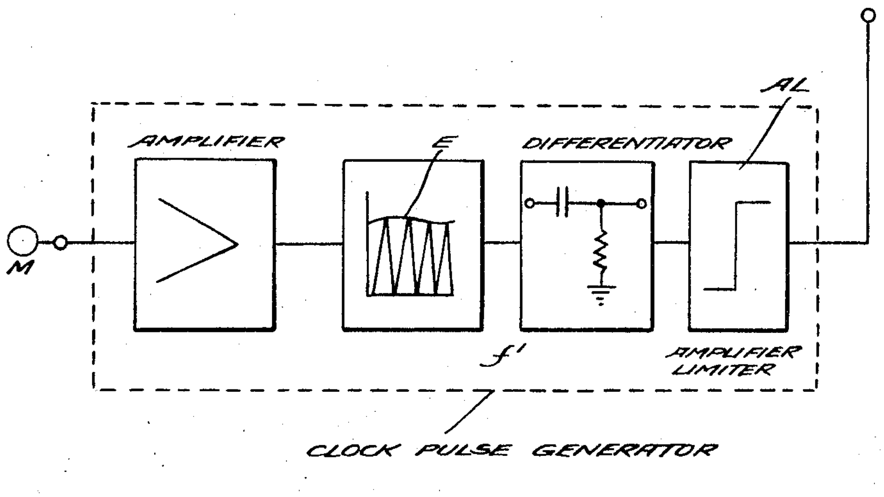
FIGURE 5 is a circuit diagram for a device for deriving an interrogation pulse flank from the envelope of a speech wave.

Another method for successively interrogating the characteristics of a spoken word representative of a number is an arrangement wherein the clock pulse generator TG produces interrogation clock pulses derived from the speech wave itself. In this event, the clock pulse generator is arranged so that the maxima of the envelope E of the speech wave are detected by a differentiator $f^1$, and at those points where the maxima occur an interrogation pulse flank is produced by an amplifier-limiter AL, as shown in FIGURE 5.

The recognition circuit E*a* can be constructed as a low pass filter and the recognition circuit E*b* can be a high pass filter, both of a conventional structure. However, other circuits which integrate the waveshape on one hand, and differentiate it on the other hand, can also be used for discriminating the portions of the sound waves. The superimposed and/or roughness wave can be averaged and compared to the superimposed and/or roughness wave. Also, recognition can be provided by using as a factor the number of times that the averaged wave crosses zero (0), and also the number of times that the waves cross through the averaged wave, thus using the averaged wave as 0.

In the embodiment of the circuit described above, no storage means is provided for the combination "OO" which is the "pause" shown in the code table of FIGURE 2. It should, therefore, be noted that this combination also belongs to the characteristics which often can be used for coding. The pause would be, for example, absence of the fundamental as well as the higher frequency oscillations, for example, as shown in the middle of the oscillogram of FIGURE 1. Extension of the coding by taking pauses into consideration may be accomplished by simply providing an additional coding flip-flop with a preceding AND-gate, which is connected to the flip-flops FF*a* and FF*b* according to the coding instruction of FIG. 2.

The word recognition arrangement can be further refined in order to recognize not only sound groups themselves and considering their time sequence, but also the duration of such sounds. The duration of a sound is indicated by the length of the rectangular pulse which is provided by actuation of one of the Schmitt triggers ST*a* and ST*b*. A statement whether this duration exceeds a predetermined threshold or not, can be provided in known manner e.g. by means of a monostable flip-flop or a saw-tooth wave which rises for the duration of the pulse. Such a binary representation is obtained which, indicates whether the duration of a sound group is long, for which the signal L is given, or short for which the signal O is given If it is "$h_1$" flip-flops FF*a* and FF*b* are actuated again according to the code of FIG. 2. This type of coding refinement can be used to assure the clear distinction between certain consonants such as "*s*" which may be pronounced in a very voiced manner, and vowels.

Also, the frequency of the occurrence of individual sound groups can be used for recognition purposes. For this purpose, counters, for example, could be used which are coordinated with the individual sound groups, and at each occurrence of a sound group within a word, such a counter would count by one unit. The result of the counting would then become a part of the word coding. The enlarging of the coding circuit and of the decoding matrix D which would become necessary upon such refinements of the word coding can be performed without difficulties in accordance with the principles set forth in the above embodiment of the invention.

It will be understood that the above description of the present invention is susceptible to various modifications, changes, and adaptations, and the same are intended to be comprehended within the meaning and range of equivalents of the appended claims.

What is claimed is:

1. In a circuit device for the automatic recognition of speech in the form of audible sound groups, for example words which are numbers, and in which electrical oscillations which correspond to the sound waves are examined at intervals with respect to certain characteristics thereof, the improvement comprising, in combination:

means for examining certain characteristics of the oscillations which are common to the sound characteristic wave form of several different sounds, said examining means including a circuit having a digital output for recognizing the presence or absence of a fundamental frequency, and a circuit having a digital output for recognizing the presence or absence of higher frequencies from the composite frequency representing the waves of the sound groups;

signal storage means for each characteristic for indicating the presence thereof in a sound group being examined and connected to said examining means for being actuated thereby upon the occurrence of such characteristic, said storage means after the sound group is terminated having outputs representative of the characteristics recognized for issuing signals into recognition channels for the sound groups;

means for periodicaly interrogating the digital outputs of said circuits; and means for actuating the signal storage means in dependence upon the order in which the characteristics associated therewith occur.

2. A device as defined in claim 1, wherein said examining means includes a circuit for recognizing the duration of the sound group being examined.

3. A device as defined in claim 1, wherein said examining means includes a circuit for recognizing the number of times that a sound group occurs.

4. A device as defined in claim 1, wherein said recognizing means for a fundamental frequency includes a low-pass filter, and said recognizing means for higher frequencies includes a high-pass filter.

5. A device as defined in claim 1, wherein said recognizing means for a fundametnal frequency includes an integrating circuit, and said recognizing means for higher frequencies includes a differentiating circuit.

6. A device as defined in claim 1, wherein said interrogating means includes an independent clock-pulse generator for effecting interrogation of the sound wave characteristics.

7. A device as defined in claim 1 further comprising a decoding network having a plurality of inputs, and a plurality of outputs each of which is significant of a different word, said signal storage means including a plurality of storing elements in parallel which are connected to the inputs of said decoding network.

8. A device as defined in claim 1, wherein said examining means includes a signal generator for each recognizing circuit, said signal generators being connected to actuate said signal storage means.

9. A device as defined in claim 8, wherein AND-gates are connected in series with the signal storage means and are fed by the signal generators, and means connected to at least one of the signal storage means for feeding a further group of storage signals to the signal generators before and after said signal storage means responds.

10. A device as defined in claim 8, wherein said signal generators and said signal storage means are bistable flip-flops, and further comprising a group of AND-gates each corresponding to a particular sound group to be recognized, a plurality of further signal generators each connected to one of said AND-gates, and a decoding matrix connected between said signal storage means and said AND-gates for transmitting the outputs of the signal storage means to the AND-gates in combined form which corresponds to the sound groups recognized.

11. A device as defined in claim 1, wherein said interrogating means includes means for generating interrogation pulses from the sound oscillations.

12. A device as defined in claim 11, wherein said interrogation pulse genearting means is arranged to be triggered by maxima of the sound frequency envelope curve.

13. A circuit device for the automatic recognition of sound groups comprising, in combination:

means for picking up spoken words and converting them into electrical signals representative thereof;

means connected to said pick up means for examining predetermined characteristics of the electrical signals which are common to the wave form of several different sounds, said examining means including a circuit having a digital output for recognizing the presence or absence of a fundamental frequency, and a circuit having a digital output for recognizing the presence or absence of higher frequencies from the composite frequency representing the waves of the sound groups;

signal storage means for said characteristics and connected to be actuated by said examining means upon the occurrence of said predetermined characteristics;

means for actuating the signal storage means in dependence upon the order in which the sound groups associated therewith occur;

a plurality of output means each representing a word to be recognized; and means connected between said signal storage means and said output means for actuating a particular output means in accordance both with the particular signal storage means which are actuated and with the sequence of actuation.

References Cited

UNITED STATES PATENTS

| | | |
|---|---|---|
| 3,225,141 | 12/1965 | Dersch. |
| 3,238,303 | 3/1966 | Dersch. |
| 3,198,884 | 8/1965 | Dersch. |

KATHLEEN H. CLAFFY, *Primary Examiner.*

ROBERT P. TAYLOR, *Assistant Examiner.*